Figure 1:
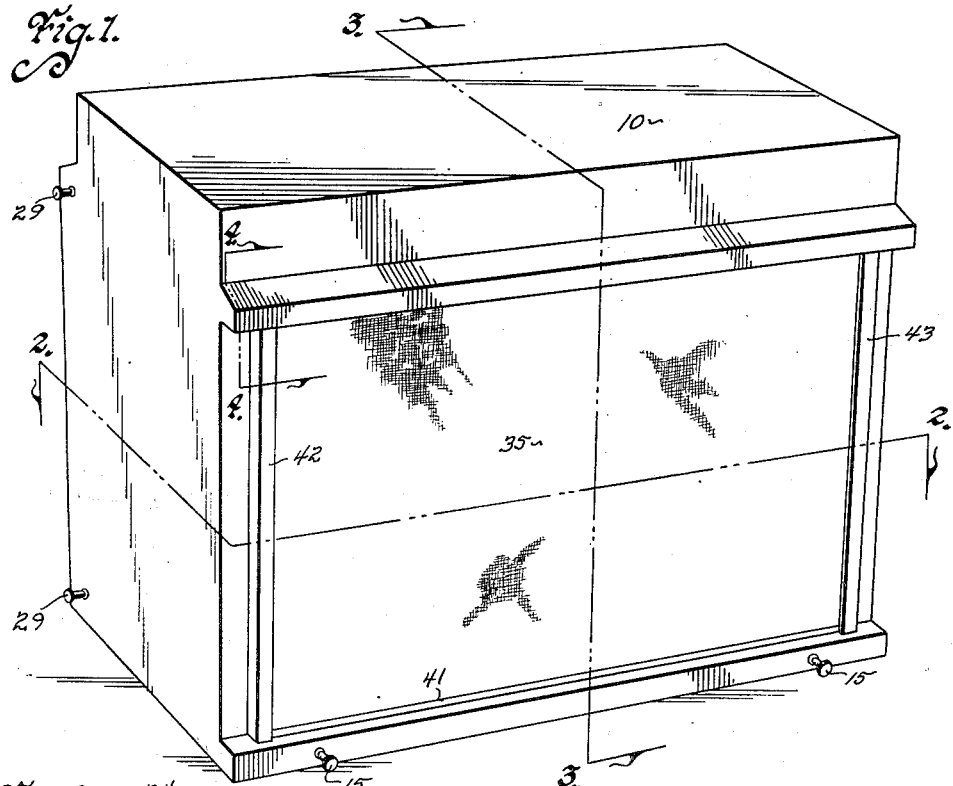

Dec. 28, 1954   L. N. ENGMAN   2,698,177
MIRROR ILLUSION TYPE ADVERTISING DISPLAY DEVICE
Filed June 16, 1951   4 Sheets-Sheet 1

Inventor: Leo N. Engman
by M. Talbert Dick
Attorney

Witness
Edward P. Seeley

Dec. 28, 1954     L. N. ENGMAN     2,698,177
MIRROR ILLUSION TYPE ADVERTISING DISPLAY DEVICE
Filed June 16, 1951     4 Sheets-Sheet 2
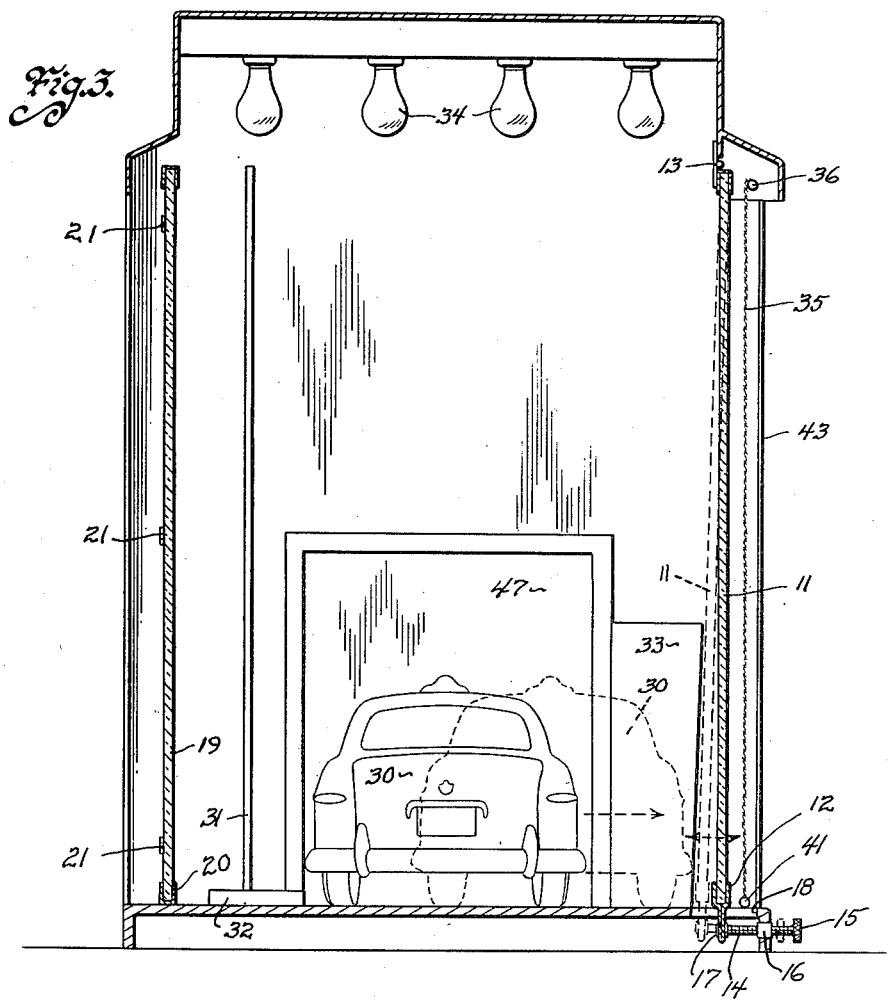
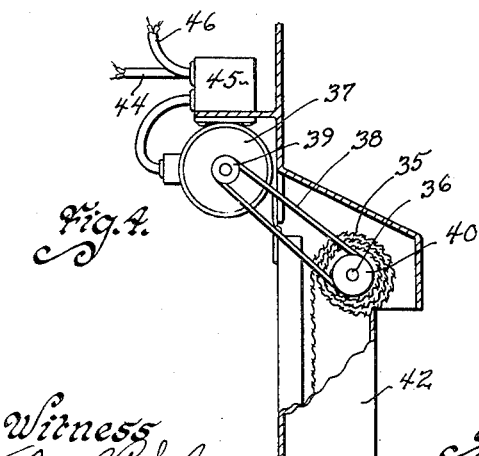

Dec. 28, 1954          L. N. ENGMAN          2,698,177
MIRROR ILLUSION TYPE ADVERTISING DISPLAY DEVICE
Filed June 16, 1951                    4 Sheets-Sheet 3

Witness
Edward P. Seeley

Inventor
Leo N. Engman
by M. Talbert Dick
Attorney

Dec. 28, 1954　　　　L. N. ENGMAN　　　　2,698,177
MIRROR ILLUSION TYPE ADVERTISING DISPLAY DEVICE
Filed June 16, 1951　　　　　　　　　　　　4 Sheets-Sheet 4

Inventor
Leo N. Engman
by M. Talbert Dick
Attorney

United States Patent Office 2,698,177
Patented Dec. 28, 1954

2,698,177

MIRROR ILLUSION TYPE ADVERTISING DISPLAY DEVICE

Leo N. Engman, Des Moines, Iowa, assignor of one-half to Thomas Patrick McGrevey, Des Moines, Iowa Application June 16, 1951, Serial No. 232,019

2 Claims. (Cl. 272—8)

This invention relates to the art of displaying merchandise or services to promote the sales thereof. Specifically, I have invented a display device that provides a visual illusion of an infinite number of the items placed in the display area.

Advertising is an old art reaching back as far as recorded history. To be effective, advertising must attract and hold the attention of the prospective customer long enough for the sales message to be delivered. The most effective means of attracting attention through visual stimuli are movement, color and lighting. If these means are well used, the prospective customer is not only attracted to the display, but is given a favorable attitude that is usually unconsciously transferred to the article advertised. A common and effective means of holding the attention of the customer once it has been attracted is to arouse the curiosity of the person toward whom the advertising is directed. This curiosity arousing means need be sufficient to hold the attention only until the advertising message is delivered. Since the amount of time required to get the message firmly into the prospective customer's conscious or subconscious mind is not easily determined, however, the longer attention can be held, the greater is the likelihood of success.

Repetition of an article by pictures is not as effective as numerous actual items which are usually much more attractive looking than are drawings or photographs of the items. The use of numerous actual items is not only expensive, but in many cases would require a display of tremendous size or at least of relatively tremendous size. As well as producing an infinite repetition of the primary object to be advertised, however, it is sometimes advisable to provide some supporting properties or items that appear only once. A technique that reproduces everything in the display an infinite number of times is not a complete solution for all advertising problems, therefor.

It obviously would be a great advance in the art if an advertising device could be provided that is very startling in appearance, arouses curiosity, and appears at least to show an almost infinite number of the actual item that is to be advertised in a display of relatively slight bulk. Such a display would be specially advantageous if it can be provided at reasonable cost.

It is the principal object of my invention, therefore, to provide an advertising display that presents the item to be advertised in a startling and unusual manner thereby not only catching the attention of the observer, but holding his interest by arousing his curiosity.

More specifically the object of the invention is to provide an advertising device that will, by reflection, multi-duplicate the item featured so that such single item so displayed will give the illusion of uncountable reproductions extending to infinity.

A further object of this invention is to provide an advertising device capable of reproducing images of the item so displayed, that permits the row of succeeding images to be curved upwardly or downwardly, or to the left, or right, thereby increasing the illusion that a great number of duplicated items are being featured.

It is a further object of my invention to create an advertising display of the type set out above that will be effective even though positioned above the normal eye level of the observer.

It is a further object of my invention to provide an advertising display that shows more than two sides of the item being advertised and in apparent infinite repetition.

It is a further object of my invention to provide an advertising display that will be hidden from view at times to arouse curiosity and avoid undesirable reflections from the display.

It is a further object of my invention to provide an advertising display that presents an apparent infinite number of the items being displayed and capable of distorting the line of images of only one of the items to cause it to curve so as to increase the illusion that numerous ones of the particular item are being displayed.

It is a further object of my invention to provide an advertising display that permits the apparently infinite reproductions to be equally spaced or to be paired off in equally spaced pairs.

It is a further object of my invention to provide an advertising display that apparently displays an infinite number of items in a relatively small space.

It is a further object of my invention to provide an advertising display that is a mirror when the light intensity is greater outside than inside said display.

It is a further object of my invention to provide an advertising display the subject matter of which may be easily changed.

It is a further object of my invention to provide an advertising display that will present an apparently infinite number of some of the items displayed and a single one of the other items displayed.

These and other objects will be apparent to those skilled in the art.

Figure 2:
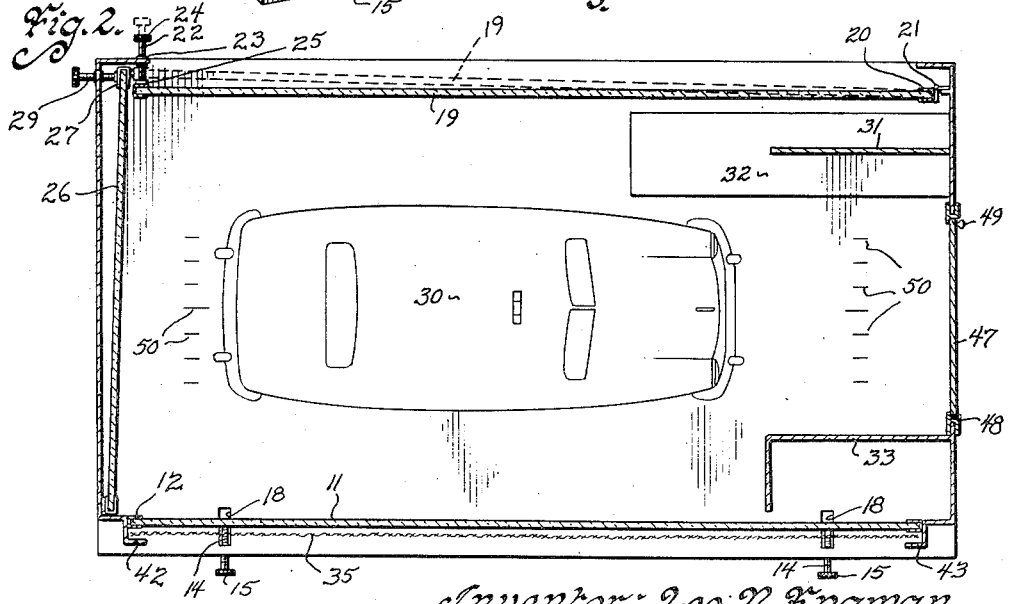
Figure 5:
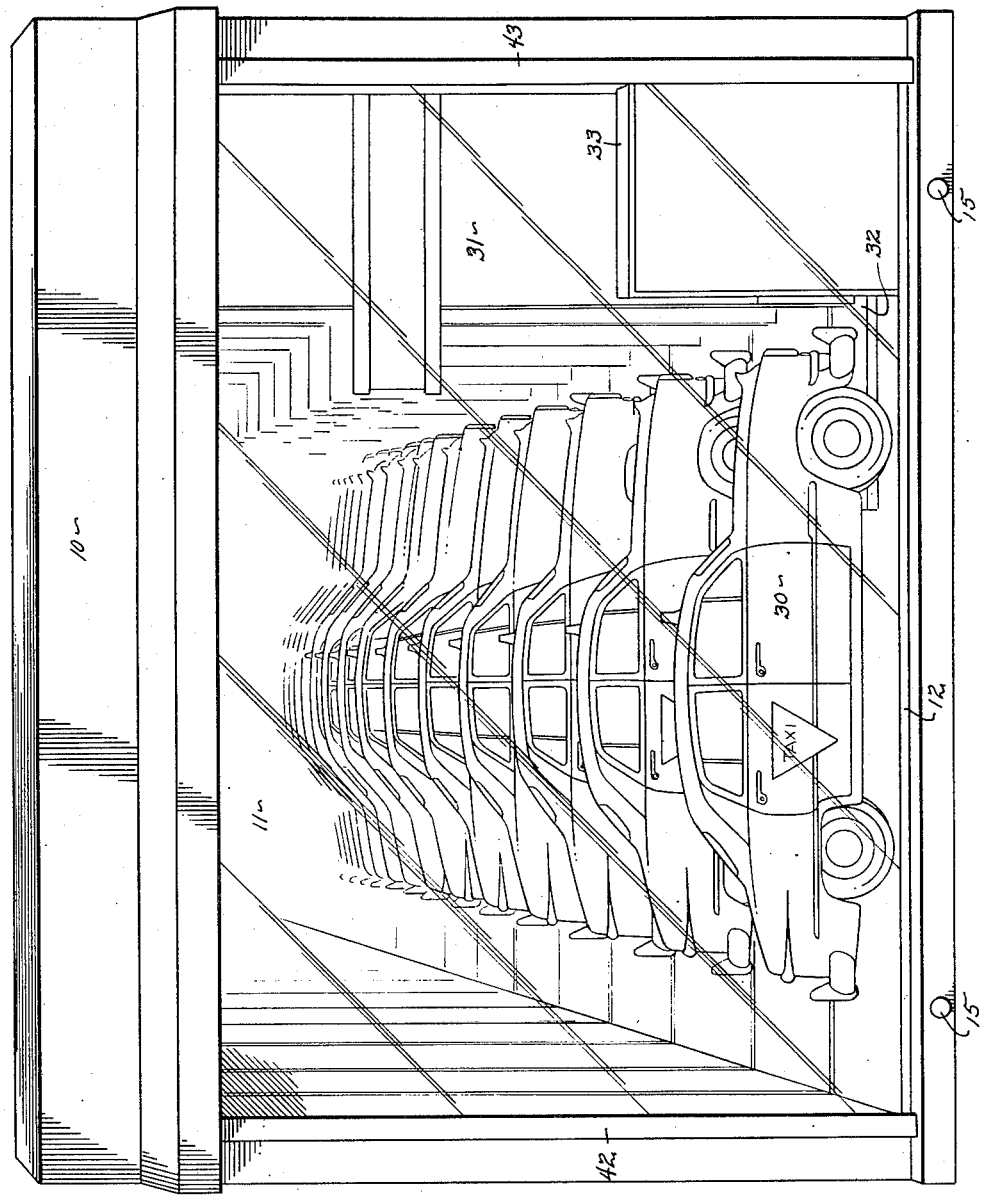
Figure 6:
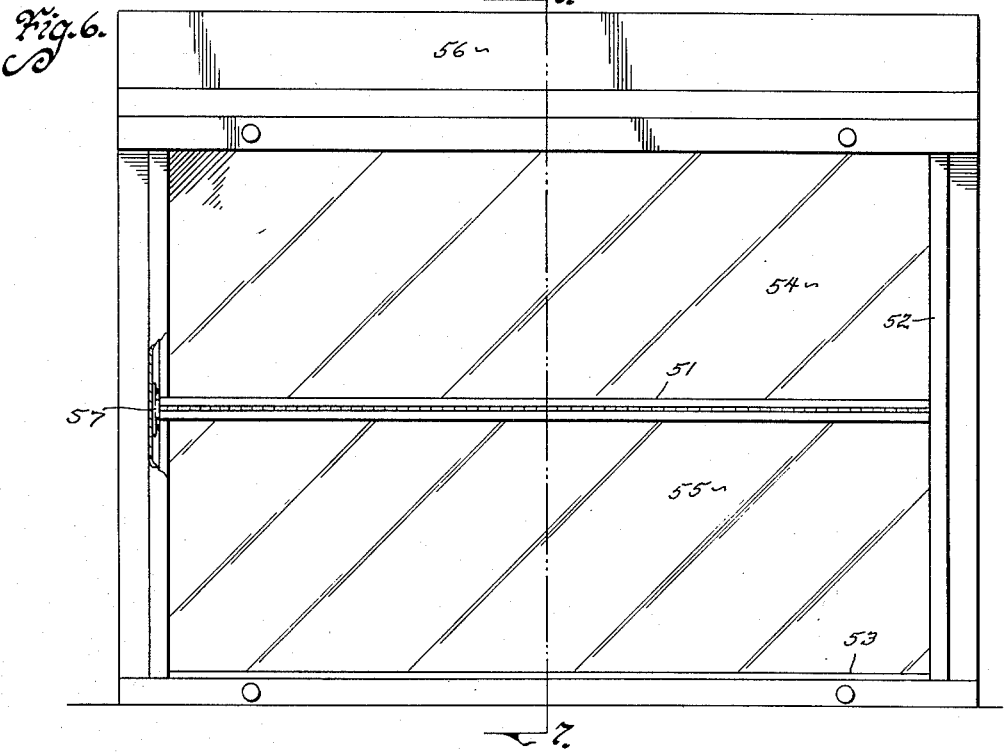
Figure 7:
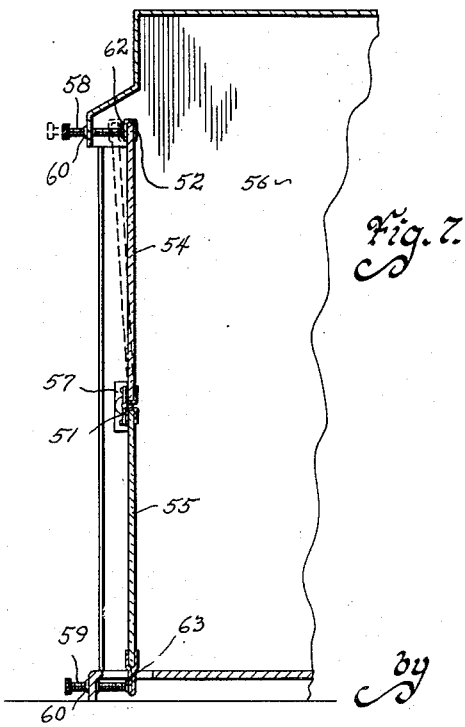

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my advertising device as it appears when the screen is drawn across the front of the device, Fig. 2 is a horizontal longitudinal sectional view of my advertising device taken on the line 2—2 of Fig. 1, Fig. 3 is a cross-sectional view of my advertising device taken on the line 3—3 of Fig. 1. Broken lines illustrate adjusted positions of the mirrors and the object being displayed, Fig. 4 is a fragmentary cross-sectional view of the screen and its operating mechanism taken on the line 4—4 of Fig. 1, Fig. 5 is a front view of my advertising device as it appears during periods of low intensity light outside and high intensity light inside the display, Fig. 6 is a front view of a modification of my advertising display in which different portions of one of the mirrors are independently movable. A portion of the housing is broken away to more clearly illustrate the construction of the device, and Fig. 7 is a fragmentary cross-sectional view of the modification taken on the line 7—7 of Fig. 6.

Referring to the drawings, I have used the reference numeral 10 to designate the external covering or frame for my advertising device which takes the form of a rectangular structure open at at least one side. If there is but one open side of the device, it is closed by a transparent mirror, or one-way mirror as this form of reflector is referred to commonly and designated 11. One of the best of these transparent mirrors is made by placing an exceedingly thin film of chrome alloy on one surface of a polished glass sheet by a thermal evaporation process. The glass thus treated is a mirror when viewed from either side if the light intensity is greater on the side from which it is being viewed than on the opposite side. When the transparent mirror is viewed from the side with lower light intensity, it is substantially transparent. The mirror is supported by frame 12. The simplest form of my advertising device would have such a mirror in fixed relation to the balance of the device, but interesting variations may be produced by changing the position of this mirror 11 with respect to the other portions of the device. I have shown the preferred form of mounting, therefore, as being hinged at the top with hinges 13 only one of which is shown in Fig. 3. The bottom of frame 12 is adjustably secured to the frame or housing 10 in any suitable manner as by the threaded bolt members 14 which are provided with knurled knobs 15 to facilitate adjustment of the threaded bolts. The bolts are necessarily universally jointed to frame or housing 10 as well as being threadably adjustable with respect thereto. As the amount of angular movement necessary for the bolt with respect to frame or housing 10 is slight, a resiliently mounted nut 16 has been found very satisfactory. The end of the threaded bolts opposite to that on which the knurled knobs 15 are formed is secured to the frame 12 by some movable means as the resilient members 17. The bolts 14 must also be rotatably movable with respect to the resilient members 17, of course. The openings 18 are provided for the adjusting means of frame 12 to extend through in order to avoid having the adjusting mechanism for the transparent mirror appear in the display portion of the device.

A second mirror 19 is mounted at the back inside of the frame or housing 10. This second mirror may be opaque or transparent depending on whether the sign is to be viewed from only one or both sides. If mirror 19 is of the opaque type, it may be either a front or back silvered form. However, a front silvered mirror avoids the double reflections sometimes experienced with mirrors silvered on the back and is therefore considered preferable. Mirror 19 is mounted in a supporting frame 20. It is also movably mounted in a manner similar to the transparent mirror 11 by means of hinges 21 at the side of the frame 20 as shown in Fig. 3. A suitable adjustment structure is provided at the other side of frame 20 such as the bolts 22 threadably engaging the resiliently mounted nuts 23 that are secured to frame or housing 10. The bolts 22 may be provided with knurled knobs 24 to facilitate turning the same while the other ends of the bolts 22 are rotatably and universally connected to frame 20 at point 25 in a similar manner to the connection by members 17 of bolts 14. Other mirrors may be provided at the sides of the inside of frame or housing 10 as the mirror 26 with its frame 27. These side mirrors may be opaque and may be movably mounted after the manner of the main front and back mirrors; hinges 28 and adjusting means 29 being provided for that purpose.

Within the device the display is arranged and is here shown for purposes of illustration as a taxi cab designated by reference number 30. A proper setting for the object 30 may be provided with painted scenery flats such as the one designated 31 which is supported in any suitable manner as by the base 32. Unlike the usual theater scenery, however, the flats used in this display must be finished on both sides since the mirrors reproduce both sides of the flat. The number and extent of these scenery elements within the display is purely optional, of course, and the showing of a single flat is in no way intended to limit the general idea of my advertising device.

When it is advisable to have some one figure or object in a display appear in single form, as for example a dispatcher for the radio equipped taxi cabs in Fig. 5; a means must be provided to avoid having an apparently infiinite number of dispatchers. This result is accomplished by avoiding the reflecting of the object in the back mirror. This result may be accomplished in several ways, but preferably, because it is the easiest and least expensive, by providing a screen 33 as shown in Fig. 2. This screen may be made in any one of numerous ways and a simple technique is to use scenery flats similar to the one designated 31. The screen must be finished on both sides, of course, since the back side will be reflected in mirror 19. The screen must be located near to mirror 11 as shown in Fig. 2 in order to prevent the reflection of any object placed inside screen 33 in mirror 19.

Some means for providing a relatively high light intensity inside the case 10 is necessary for the operation of the device. The lighting elements 34 are provided for this purpose. Generally speaking, it is undesirable to have the lights visible from outside the case 10. A simple means of concealing them is provided by merely extending the case 10 for a distance above mirrors 11 and 19 as shown in Fig. 3 and placing the lights in this raised portion.

As the properties of transparent mirrors depend entirely on the relative light intensities on opposite sides, an outdoor sign of the type herein disclosed in the daytime will almost invariably be a mirror. It is possible that on very dark days the light intensity could be made greater inside the sign than the prevailing intensity outdoors. During normal and usual daylight conditions, however, the display will be a mirror. Under such conditions, numerous undesirable reflections might be produced. To avoid reflected sunlight glare and other undesirable reflections, therefore, a non-reflecting cover or curtain may be provided such as the one designated 35 in Fig. 1. Some means should be provided for removing the curtain when the display is to be shown as by mounting the curtain 35 on a rotatable roller 36. The roller 36 is provided with some suitable means for rotating it in two directions such as the reversible motor 37 that is connected to the roller 36 by the belt 38 over the pulleys 39 and 40 respectively. The curtain 36 is also provided with a lower rod 41 to aid in holding the bottom edge of the curtain straight and to provide a weight that tends to pull the curtain 35 downwardly as roller 36 is turned to unwind the curtain. Flanges 42 and 43 may be provided to prevent air currents from getting behind the curtain 35. When the display is provided with two transparent mirrors both of which are visible to passersby, a second curtain may be provided for mirror 19. The motor 37 is connected to some suitable source of power by the line 44 which may be passed through the control box 45. The line 46 is provided to a manual control means which may be the only means of control or may be in conjunction with light responsive automatic control that will open the curtain whenever the outdoor light intenstiy is above a certain value.

In order to permit the item shown in the display area of my advertising device to be easily and quickly changed, a door 47 is provided in frame or housing 10. This door may be of any appropriate type, and I have shown for purposes of illustration a swinging door mounted on the hinges 48. A suitable catch such as the one 49 should also be provided so that the contents of the display may be protected from vandalism. For reasons that will be brought out in the discussion of the operation of the device, a plurality of reference marks or indicia designated 50 are made on the floor of the display area to permit arranging the item to be advertised exactly in the center of the area or nearer to the front or back as the case may be.

In the modification shown in Fig. 6, a means such as hinge 51 is used to provide a means for movably connecting the frames 52 and 53 with their respective mirrors 54 and 55 together. The hinge is supported at each side of the housing 56 by the brackets 57 only one of which is shown. Screw threaded bolts designated 58 and 59 threadably engage movably mounted nuts 60 and 61 respectively. The bolts are rotatably and movably connected to frames 52 and 53 at the points 62 and 63 respectively and are an illustrative means for moving the mirrors on hinge 51. The device shown in this modification is otherwise essentially like the display disclosed in the other drawings. This completes the structural description of my display and I will now describe its operation.

The device is placed where at least one side of the device may be observed, and the object to be advertised is placed in the display area between the mirrors 11 and 19. When the area around the display is of a low light intensity, the light elements 34 are energized. The curtain 35, if present, is retracted by motor 37 or whatever means are provided for that purpose. The interior of the display becomes visible at this point. What is seen is the item and then seemingly innumerable reflections of it thrown back and forth between mirrors 11 and 19. If the item such as taxi cab 30 is placed exactly in the center of the display area as shown in Fig. 2, the images appear to be equally spaced as shown in Fig. 5. The images appear as spaced pairs when the item is moved nearer to either mirror as shown in Fig. 3 by the broken lines. Some variation in the display may be created by moving the item within the display area, therefore. The indicia 50 are for the purpose of correctly locating the item.

Another interesting series of effects may be created by moving the mirrors 11 and 19 with respect to each other. By moving mirror 19 as shown by the broken lines in Fig. 2, the row of images of Fig. 5 may be made to curve laterally. A similar effect may be created in a vertical direction by moving mirror 11 as shown by the broken lines in Fig. 3. This vertical distortion of the line of images also makes it possible for the sign to be viewed from a level lower than that at which the display itself is arranged. Nearly everyone has had the experience of tipping a bureau mirror so that he can see himself in it. The principle there applied is identical to that used here. By combining these two mirror adjustments, curves that are combinations of lateral and vertical directions are produced. A still further variation of this curving of the line of images can be produced when the modified form of display shown in Figs. 6 and 7 is used. When the mirror is divided into parts that can be moved relative to each other, the line of images of a portion of the display may be curved and the balance of the display held straight or curved in a different direction from the curve produced by movement of the other of said mirrors. By having the back mirror divided with a vertical hinge almost unlimited variation can be produced. In a very large sign, the front mirror may be divided into numerous panels one or more of which may be movable in one or more directions. Such a structure could curve a portion of the display and produce the same results for this portion as are described in relation to the whole display in the form of the device shown in Figs. 1, 2, 3, 4, and 5, when both mirrors are adjusted to positions away from the vertical.

Both sides of the device may be open and transparent mirrors used on both sides. This sort of a structure would permit viewing the display from either side. Since the transparent mirrors are mirrors on their brightly lighted sides and transparent when viewed from the side having relatively low light intensity, persons on each side of the device can see into the device but cannot see through it. The reflected images will be the same when viewed from either side except when the screen 33 is used to display only one image of some one item in the advertising device. Such a display will be particularly valuable when two streets come together at an acute angle, and the display can be seen by people on each of the two streets. Smaller indoor signs of this type may be mounted on a counter or show case which separates two aisles in a store. This display would be visible to people in both aisles which would double the potential buyer audience.

The curtain 35 will be lowered on outdoor signs whenever the light intensity is high as when the sun is out. An advertising message may also be placed on the curtain so that the message of the seller will be present twenty-four hours a day.

As the only acts necessary to change the display are to open the case by means of door 47 and substitute the new items for the old ones, the sign is very versatile. The sign board may be used to advertise numerous different items at different times. The relatively high cost of constructing the sign itself is, therefore, compensated for by the relative ease of changing the subject matter of the sign. Also, of course, the items displayed may be actual items at least in the case of large items such as cars or the like in outdoor signs and small items in indoor signs. As the items are in no way damaged by their use in the display, the only cost in operation of the display is the power used for lighting. Also, of course, the sign has the major compensation for any cost involved in using it of presenting a very striking, attention catching, and curiosity arousing display that will be very effective as compared to many signs now being used.

Some changes may be made in the construction and arrangement of my advertising display device without departing from the real spirit and purpose of my invention, and it is my intention to cover by my claims, any modified forms of structure or use of mechanical equivalents which may be reasonably included within their scope.

I claim:

1. In an advertising display device, a housing having an opening in one of its sides, a plane mirror in and hinged to said housing and facing the opening in said housing, a horizontal floor area in said housing between said mirror and the opening in said housing for supporting the material to be advertised, a plane transparent mirror enclosing the opening of said housing, a means for illuminating said area, and manually operated adjusting means comprising an axially movable threaded bolt, operatively connected to said housing and a free end of said first mentioned mirror capable of changing the vertical angularity of said mirror with respect to said housing and said transparent mirror sufficiently to cause the images of said material to be reflected from mirror to mirror in various vertical arrangements so that their path will extend upwardly or downwardly relative to said horizontal floor area.

2. In an advertising display device, a housing having an opening in one of its sides, a plane mirror in and hinged to said housing and facing the opening in said housing, a horizontal floor area in said housing between said mirror and the opening in said housing for supporting the material to be advertised, a plane transparent mirror enclosing the opening of said housing, a means for illuminating said area, and manually operated adjusting means comprising an axially movable threaded bolt, operatively connected to said housing and a free end of said first mentioned mirror capable of changing the horizontal angularity of said mirror with respect to said housing and said transparent mirror sufficiently to cause the images of said material to be reflected from mirror to mirror in various horizontal arrangements so that their path will extend to the right or left of the material being displayed.

References Cited in the file of this patent

UNITED STATES PATENTS

| Number | Name | Date |
|---|---|---|
| 888,569 | Zarella | May 26, 1908 |
| 1,612,100 | Dailey | Dec. 28, 1926 |
| 1,680,855 | Burns | Aug. 14, 1928 |
| 2,042,268 | Michaus | May 26, 1936 |
| 2,118,131 | Alexander | May 31, 1938 |
| 2,132,472 | Holm | Oct. 11, 1938 |
| 2,132,473 | Holm | Oct. 11, 1938 |
| 2,163,562 | Putnam | June 20, 1939 |
| 2,483,901 | Harris | Oct. 4, 1949 |

FOREIGN PATENTS

| Number | Country | Date |
|---|---|---|
| 581,389 | Germany | A. D. 1933 |